Feb. 14, 1933.   W. L. RUTKOWSKI   1,897,960
DISPENSING CONTAINER
Filed Oct. 1, 1931
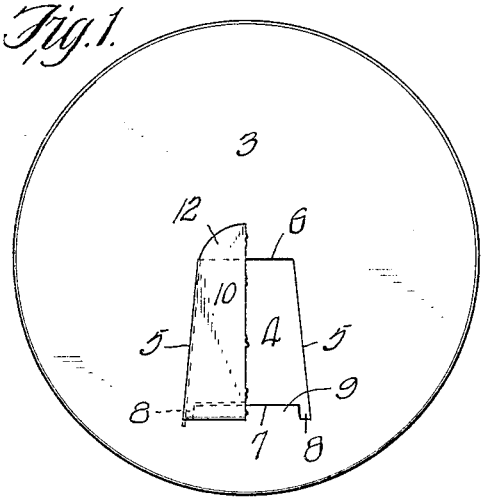
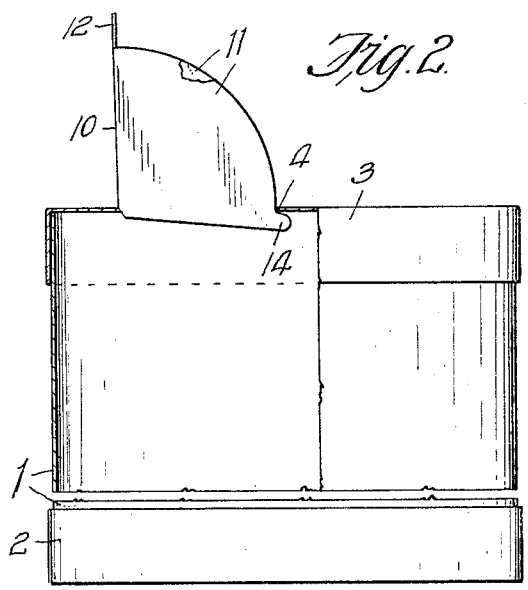
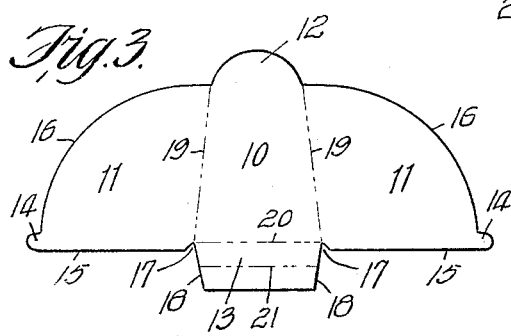
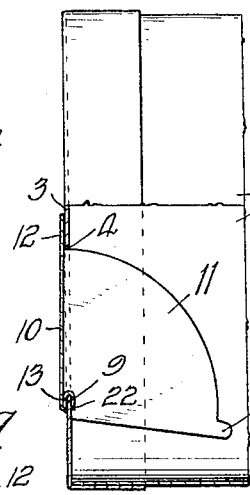
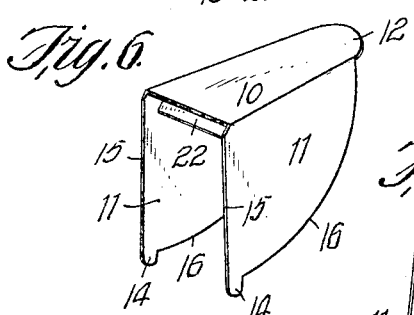
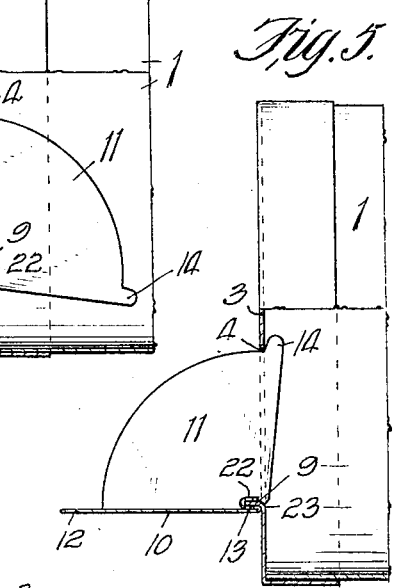
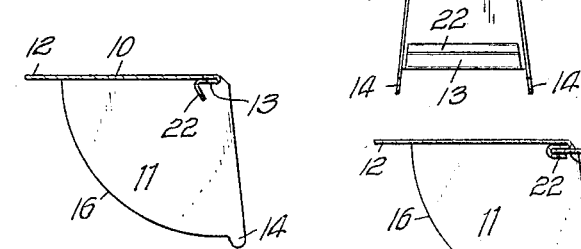
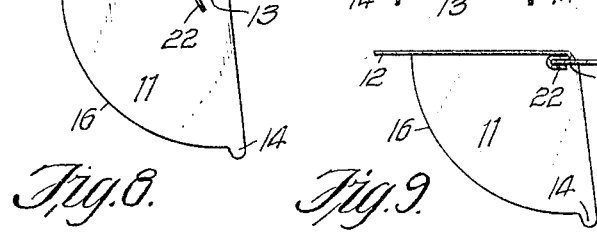
INVENTOR:
W. L. Rutkowski.
BY
ATTORNEY.

Patented Feb. 14, 1933

1,897,960

UNITED STATES PATENT OFFICE

WALTER L. RUTKOWSKI, OF ST. LOUIS, MISSOURI, ASSIGNOR TO R. C. CAN COMPANY, OF ST. LOUIS, MISSOURI, A CORPORATION OF MISSOURI

DISPENSING CONTAINER

Application filed October 1, 1931. Serial No. 566,350.

My invention relates to dispensing containers.

The object of my invention is to provide a container with a pouring spout, whereby dry substances, such for instance as salt, beans, peas, coffee and like products may be discharged from the container without loss or waste and without the necessity of removing the cover from the container.

Another object of the invention resides in the provision of a pouring spout, which is clamped at one end thereof to a tongue forming a part of the cover and which extends into an opening in the cover from one edge thereof to act as a hinge to permit swinging movement of the spout.

A still further object of the invention is the provision of a dispensing container which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawing forming a part of this specification, wherein like characters of reference denote similar parts throughout the several views:

Fig. 1 is a top plan view of a dispensing container equipped with my improved pouring spout in its closed position, the spout being partly broken away to show the opening in the container cover.

Fig. 2 is a view of the container shown partly in side elevation and partly in sectional elevation with the pouring spout shown in side elevation and as in open position.

Fig. 3 is a plan view of the pouring spout blank.

Fig. 4 is a view of the container shown partly in side elevation and partly in sectional elevation with the pouring spout shown in sectional elevation and in its closed position.

Fig. 5 is a view similar to Fig. 4, but showing the pouring spout in its full open position.

Fig. 6 is a perspective view of the pouring spout formed from the blank shown in Fig. 3.

Fig. 7 is a bottom plan view of the pouring spout.

Fig. 8 is a sectional elevation of the pouring spout before being applied to and clamped to the cover tongue.

Fig. 9 is a sectional elevation of the pouring spout showing it as clamped to the cover tongue.

In carrying out the aim of my present invention, I employ a paper, or cardboard can body 1, preferably, although not necesarily cylindrical in shape.

The can body, which is of any desired size is provided with a bottom suitable paper or cardboard closure 2, which is suitably secured against removal. The opposite, or upper end of the can body is also provided with a suitable paper or cardboard closure 3 which is also suitably secured against removal from the can body.

The upper closure 3 of the can body 1 is provided with a filling and pouring opening 4 having converging side edges 5 and parallel end edges designated 6 and 7, respectively, as clearly shown in Fig. 1. The cover 3 is provided at each of the rear corners of the opening 4 with a slot, or cutaway portion 8 of suitable width and length, as shown in Fig. 1, to provide a paper, or cardboard hinge tongue 9 which is integral with the cover 3 and directed into the cover opening 4.

The pouring spout which I attach to the cover 3 is formed from a blank of suitable metallic stock, as shown in Fig. 3. The blank is so shaped as to form top section 10, a pair of segmental or wing sections 11, a finger pull section 12 directed from one end of the top section 10, a clamp section 13 which is directly opposite the finger pull section 12 and a pair of stop sections 14, one of which is directed from each outer corner of the segmental sections where the rear straight edges 15 thereof would join with the curved edges 16 thereof, as will be clearly apparent from Fig. 3. The blank is also provided with a pair of angular shaped notches 17 at the corners formed at the junction of the straight edges 15 of the segmental sections 11 and the side edges 18 of the clamp sections 13.

The blank is formed into spout formation by bending the segmental sections 11 downwardly along the bending lines designated 19 in Fig. 3 so that they will lie at approximately right angles to the top section 10, as will be apparent from Fig. 6.

The clamp section 13, it will be understood is folded back against the inner face of the top section 10 by bending same on the bending line 20 and then it is again bent back toward itself on the bending line 21 to the desired position, as shown in Fig. 8. After the spout, as shown in Fig. 8, has been thus formed from the blank shown in Fig. 3, it is ready for application to the cover 3.

The spout is applied to the cover 3 before the cover is secured to the can body 1, by first positioning the spout to closed position within the opening of the can cover 3, which causes the first fold of the clamp section 13 of the spout to lie upon the hinge tongue 9 of the cover 3, as will be apparent from Fig. 8 where the hinge tongue 9 of the cover 3 is shown in dotted lines. After the pouring spout has been thus positioned, the second fold designated 22 of the clamp section 13 is then forced back into tight contact with the underface of the hinge tongue 9 of the cover 3 as will be clearly apparent from the detail shown in Fig. 9 and also as clearly shown in Figs. 4 and 5.

When the pouring spout is in its closed position, as shown in Figs. 1 and 4, the finger pull 12 lies in contact with the upper surface of the top closure 3 adjacent the edge 6 of the cover opening 4, thereby limiting closing movement of the spout and the rear edge portions of the segmental or wing sections lie in the slots 8 of the top closure 3 with the outer faces of the wing sections of the spout engaging the converging side edges 5 of the top closure 3, thus completely closing the opening 4, as the spout is made to conform to the size of the top closure opening 4.

When the pouring spout is in its open position, as shown in Figs. 2 and 5, the hinge tongue 9 of the top closure is bent, or flexed, as at 23, as clearly shown in Fig. 5, and the stops 14 of the segmental or wing sections 11 of the spout contact with the inner face of the top closure 3 adjacent the edge 6 of the top closure opening 4 to limit the opening movement of the pouring spout, as is manifest.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. A non-detachable pouring spout for dispensing containers comprising a top section, a pair of wing sections, a finger pull directed from one end of the top section, stops integral with the wing sections and a foldable clamp section opposite the finger pull, in combination, with a container cover having an opening provided with end slots to form a hinge tongue integral with the cover and directed into the opening, said spout adapted to be inserted into the cover opening from the outside after a portion of the clamp section is first folded back, placing it back to back with the top section of the spout so as to lie upon the hinge tongue of the cover and after so positioning the spout, bending the remaining portion of the clamp section to engage the lower face of the hinge tongue for clamping the hinge tongue between the folded portions of the clamp section of the spout.

2. A dispensing container having a cover with an opening therein, a hinge tongue formed of the material along one edge of the cover opening, said tongue being spaced from the side edges of the cover opening by end slots, a spout formed from a blank of metallic stock, a finger pull at one end of the blank, a clamp section opposite the finger pull, a portion of the clamp section adapted to be folded back for contact with the underface of the blank and the remainder thereof then folded back toward the first fold line to provide a clamp for gripping the hinge tongue of the cover, said blank having segmental wing portions bent along converging lines and a stop at the lower corner of each segmental wing section adapted to engage the inner face of the cover when the spout is swung to its open position.

3. A dispensing container comprising a can body, a bottom closure, a top closure having an opening provided with corner slots at one end thereof to form a hinge tongue directed into said opening, a metallic pouring spout embodying a top section, a pair of segmental wing sections disposed at approximately right angles to the top section, stops integral with the wing sections, a finger pull integral with one end of the top section and a clamp section at the end of the top section of the spout opposite the finger pull thereof, said clamp section being formed by first folding back a portion thereof to place it back to back with the top section of the spout and completing the clamp action by the forward bending of the remaining portion of the clamp section.

4. A metallic blank from which a pouring spout for dispensing containers is formed, said blank comprising a top section, a finger pull at one end thereof, a clamp section at the opposite end of the top section from that of the finger pull, a pair of wing sections directed from opposite sides of the top section to lie at approximately right angles to the top section, a stop extension for each wing section and the rear edge of each wing section being notched on opposite sides of the clamp section.

5. A receptacle having a pouring opening with a hinge tongue directed thereinto, a pouring spout therefor having a clamp section integral with one end of the top thereof for connection with said hinge tongue and said clamp section having a portion folded back placing it back to back with the top of the pouring spout and the remaining section being bent forward to permit the hinge tongue of the receptacle to be positioned between said portions of the clamp section and to be gripped therebetween upon the latter portion of the clamping section being forced into contact with the lower face of the hinge tongue.

In testimony whereof, I have hereunto affixed my signature.

WALTER L. RUTKOWSKI.